United States Patent Office 2,875,731
Patented Mar. 3, 1959

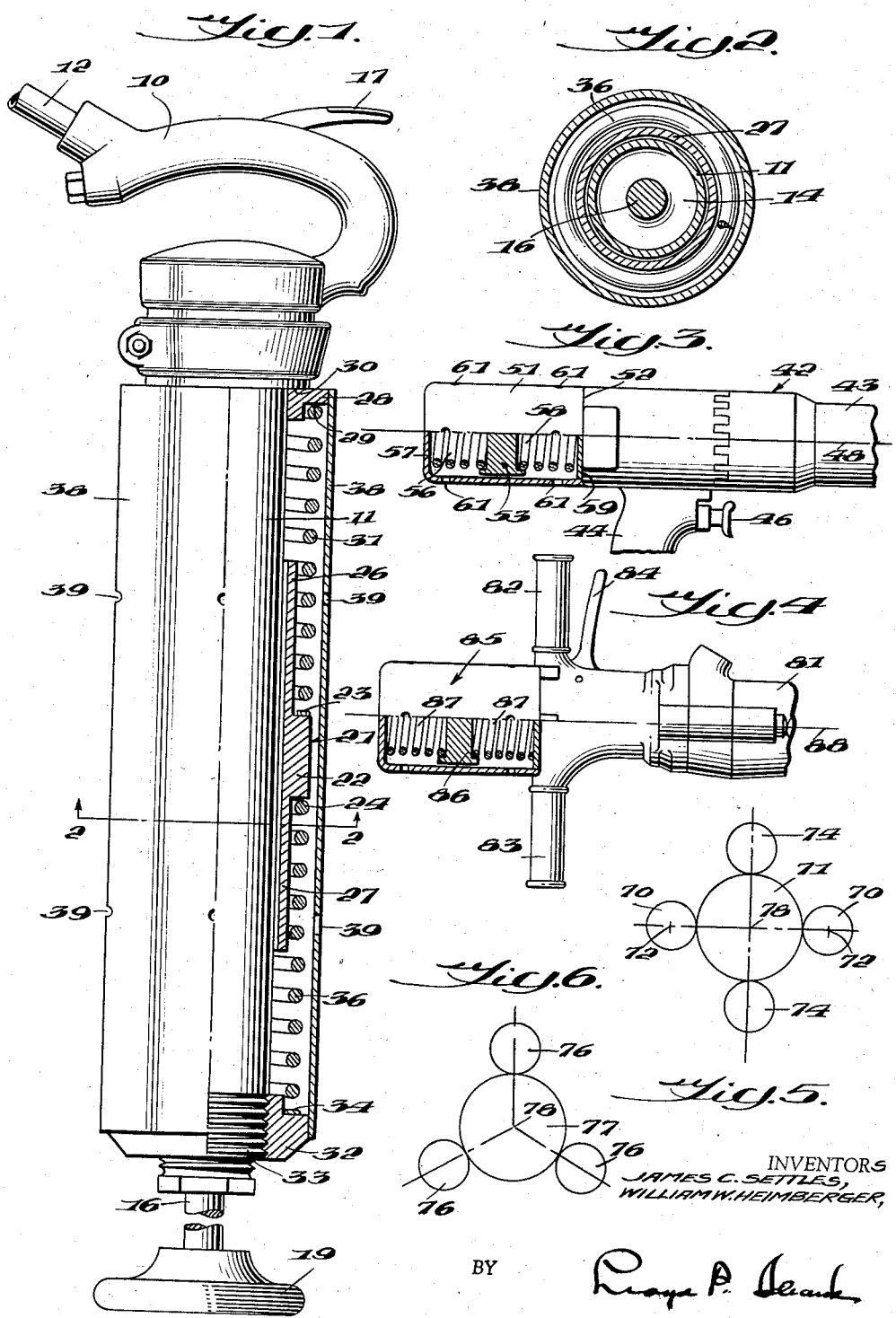

2,875,731

VIBRATION ABSORBERS FOR RECIPROCATING TOOLS

James C. Settles and William W. Heimberger, Columbus, Ohio, assignors to The Buckeye Steel Castings Company, Columbus, Ohio Application March 23, 1956, Serial No. 573,447

5 Claims. (Cl. 121—13)

This invention relates to dynamic vibration absorbers for eliminating vibratory movements of the body structure of devices or implements wherein the tool or work engaging element reciprocates or oscillates during operation and the invention has particular utility in connection with power actuated devices such as those operated by compressed air to reciprocate a tool or the like.

A number of pneumatically actuated devices such as sand rammers, chipping hammers, scallers, demolition tools and the like includes a cylinder in which a piston is arranged for reciprocation. The cylinder forms a portion of the body of the implement and the piston is forced to move within the sylinder by air under pressure supplied at one end of the cylinder until the piston arrives at a position adjacent the other end when the air pressure is then supplied into the opposite end of the cylinder to move the piston in a reverse direction and the piston thus performs recurring reciprocating movements. Such implements often include a piston rod extending beyond the end of the cylinder on which a tool is mounted or a stem of the tool may form the piston rod. The compressed air applied to opposite sides of the piston serves to move it for performing work but the air acts on the cylinder which forms a part of the body of the device causing the implement to vibrate with the same frequency as that of the piston. These pneumatic devices are usually of the type which are held and manipulated manually and the vibration is tiring to the operator and a portion of the energy which reacts to move the body of the device is not available for carrying out useful work. The larger pneumatic equipment such as a slogger employed for jarring sand from castings and which includes a cylinder for a compressed air actuated piston is usually supported by a structural frame and the vibration of the body of such pneumatic devices are transmitted to the supporting structure. The vibrations are often of such amplitude to cause destruction of the supporting structure to thereby present maintenance problems.

An object of the present invention is to provide a dynamic vibration absorber for devices wherein the tool is driven and performs reciprocating or oscillating movements to substantially eliminate vibration of the body of the device and thereby relieve an operator of tiring vibration and when the reciprocating implement is structurally supported to eliminate the vibrations which would otherwise be transmitted to the supporting structure.

Another object of the invention is to provide a dynamic vibration absorber of such a design that it may be mounted on reciprocating implements without materially increasing the weight of such devices and without unduly increasing the bulk of the equipment particularly when it is of the hand-operated type.

A further object of the invention is to provide a dynamic vibration absorber which is so mounted on a power driven reciprocating device as to eliminate vibratory movements of the body of such a device whereby the energy supplied to the implement is utilized for performing useful work without loss of energy in vibrating the body portion of the device.

Other and further features and objects of the invention will be appreciated and become apparent to those skilled in the art pertaining to vibration control and as the present disclosure proceeds and upon consideration of the following detailed description taken with the accompanying drawing wherein several embodiments of the invention are disclosed.

In the drawing:

Fig. 1 is a side elevational view of a sand rammer of conventional design with a dynamic absorber mounted thereon with parts of the vibration suppressing means shown in section.

Fig. 2 is a transverse sectional view taken on the line 2—2 of Fig. 1.

Fig. 3 is fragmentary elevational view of a portion of another pneumatic device with a modified dynamic vibration absorber mounted thereon.

Fig. 4 is a side elevation of a rear portion of a demolition implement with a vibration control unit mounted thereon.

Figs. 5 and 6 are diagrammatic views illustrating other arrangements of vibration absorbers in association with a reciprocating device.

The invention is directed to means for eliminating movements of the body of implements wherein the tool or work engaging element is power driven to perform reciprocating or oscillating movements. The invention provides for the elimination of undesirable vibratory movements of the body of the device and avoids loss of energy which has been expended in the past in causing the body of the device to perform vibratory movements. The so-called "pneumatic tools" provide a group to which the invention is particularly applicable and they include a piston which is mounted for forward and reversed movements within a cylinder under the action of compressed air. The air supplied to alternate sides of the piston acts on the cylinder of such devices causing the body of the implement to vibrate with the same frequency of motion as the piston. The invention pertains to means for eliminating such vibratory movements of the body of such devices.

There is shown in Fig. 1 a conventional and known type of pneumatic device which includes a handle 10 and a cylinder 11 which form the body of the implement. Air under pressure is supplied to the device through a conduit connection 12 and the compressed air passes through the handle 10 and is admitted to opposite sides of the piston 14 (Fig. 2) in a known manner so that the piston 14 and its piston rod 16 perform reciprocating movements. A valve (not shown) in the handle 10 is controlled by a lever 17 to admit air to the cylinder 11 and the supply of air is interrupted by permitting the lever 17 to return to an off position which is usually effected by means of a spring or the like. The pneumatic device shown in Fig. 1 is representative of a number of implements which are manually handled and the air control valve is actuated by the fingers or thumb of one hand of the operator when grasping the handle 10. Any of a number of different tools or work elements may be actuated by the piston 14. In the embodiment illustrated a sand tamper element 19 is secured to the free end of the piston rod 16. After the piston 14 starts its reciprocating movements the air control valve is completely opened and the implement is operated under the air pressure available through the supply conduit 12. Under these conditions the piston 14 reaches its maximum frequency of reciprocation which is maintained as long as the air supply line remains open and as long as the pressure remains substantially constant. The air pressure reacting on the cylinder 11 causes the body of the device including the handle 10 to vibrate with the same frequency of motion as the piston.

A vibration absorber which provides for the elimination of such vibratory movements of the body of the implement is shown in Figs. 1 and 2. The absorber means includes a mass or weight 21 which is spring supported on the body of the device. In this embodiment the weight or mass 21 is generally of cylindrical formation and includes an intermediate portion 22 having shoulders 23 and 24 at the opposite ends thereof. The weight 21 includes cylindrical tubular portions 26 and 27 which extend from opposite ends of the intermediate portion 22. The interior diameter of the entire weight 21 is such that it fits about the periphery of the cylinder 11 but is free to move axially therealong without frictional restraint or drag.

A ring member 28 surrounds the rear end of the cylinder 11 which is provided with an annular spring seat 29 thereon. The ring member 28 may be shaped to have abutting relationship with the body of the device as indicated at 30. If desired it may be secured to the cylinder 11 in any suitable manner. A helical spring 31 is positioned between the shoulder 23 and the spring seat 29. This spring has a diameter so as to embrace the cylinder 11 and the periphery of the axially extending annular flange 26. Another ring member 32 is mounted adjacent the forward end of the cylinder 11 and in the embodiment illustrated this ring member is provided with internal threads for engaging the threaded exterior 33 of the cylinder. A shoulder is provided on the ring member 32 forming an annular spring seat 34 thereon. Another spring 36 of the helical type is arranged to engage the shoulder 24 on the weight 21 and the spring seat 34. In assembling these parts on the pneumatically operated device the ring member 28 is first placed in position over the cylinder 11. It may be secured in abutting relationship with an annular shoulder 30 adjacent the rear end of the cylinder 11. The spring 31 is then slipped over the free end of the cylinder 11 after which the tubular shaped weight 21 is arranged in position so that the annular shoulder 23 engages the forward end of the spring 31. The spring 36 is then applied and the ring member 32 is mounted in position. In assembling the parts the springs 31 and 36 are compressed to assure that both of the springs will remain in contact with the annular shoulders 23 and 24 during maximum movements of the mass 21.

The absorber means may be enclosed by a tubular shaped shield 38 which may be secured to the ring members 28 and 32 in any desirable manner. The shield 38 surrounds and encases the entire absorber mechanism and provides a safe hand grip for the operator. A plurality of holes 39 are provided through the tubular shaped shield 38 and distributed thereover to permit air to escape from the interior thereof and avoid the possibility of air being trapped inside the tubular shield which would tend to damp motion of the absorber weight 21. The internal diameter of the shield 38 is larger than the diameter of the springs 31 and 36 and larger than the largest cross sectional area of the auxiliary mass 21. An annular space is provided between the interior of the shield 38 and the exterior of the cylinder 11 to permit free movement of the weight 21 and the springs 31 and 36 without any appreciable drag or resistance to motion of the mass 21.

When the piston 14 in the cylinder 11 is actuated under the maximum air pressure supplied to the conduit fitting 12 its frequency of reciprocation or oscillation is substantially constant. The body of the implement including the cylinder 11 is set in vibration at the same frequency and such movements of the body portion are completely eliminated by a proper design on the parts of the absorber. It is to be noted that the axis of the springs 31 and 36 are coincident with the axis of the cylinder 11. The natural frequency of the mass 21 resiliently restrained by the springs 31 and 36 is such as to be equal to the frequency of vibration of the cylinder 11 and the body of the device. It will be observed that the annular space between the exterior of the cylinder 11 and the inner surface of the shield 38 is such as to provide for motion of the mass 21 whereby the springs 31 and 36 may exert force on the body of the device as applied to the ends of the cylinder 11 which is equal to the force provided by the compressed air.

In operation the body of the implement including the cylinder 11 is set in vibration during reciprocation of the piston 14. The weight or mass 21 is also set in motion with the same frequency as that of the body of the pneumatic device. The weight 21 while vibrating at the same frequency moves with a phase lag of one hundred and eighty degrees behind that of the movements of the body portion of the device. Such oscillations of the mass 21 develops forces which are supplied to the body of the implement through the springs 31 and 36 which is at all times equal in magnitude and opposite in direction to the force derived from the compressed air. Such action of the weight 21 results in complete elimination of the vibration of the cylinder 11 and the body portion of the pneumatic device and relieves the operator of tiring vibrations. If the pneumatic device is structurally supported there is an elimination of vibration for transmission to the supporting structure. The absorber mechanism increases the efficiency of the pneumatic devices because the maximum working force is developed and no energy is lost in moving the body portion of the device.

Dynamic vibration absorber means of the type herein disclosed may be mounted on various other types of power driven devices wherein the tool or work element performs a reciprocating movement. In Fig. 3 a pneumatically operated device 42 is shown as representative of a group wherein the cylinder 43 for accommodating the reciprocating piston is such that it is not feasible to arrange the weight around the cylinder. The device shown in Fig. 3 is provided with a pistol type hand grip 44 and the valve for controlling the supply of air to the cylinder 43 is controlled by a knob or push button 46 mounted on the grip 44. In such a pneumatically operated device and others the dynamic vibration absorber is mounted with the center of gravity of the absorber in alignment with the axis 48 of the cylinder 43 and the mass is resiliently supported for movements in alignment with the axis 48.

In this arrangement illustrated in Fig. 3 a cup-shaped shield 51 is mounted on the rear end 52 of the body of the pneumatic device. The weight or mass 53 is of disc shape and the center of the mass is in alignment with the axis 48 of the cylinder 43. Space is provided between the periphery of the weight 53 and the interior surface of the shield 51 so that the weight 53 may move freely without any appreciable frictional drag or resistance to the motion thereof. One helical spring 56 is partially compressed between one face of the weight 53 and the closed end 57 of the shield 51. Another spring 58 is partially compressed between the other face of the mass 53 and the end wall of the pneumatic device or a disc 59 which serves to close the end of the cup-shaped shield. The absorber assembly may be secured to the pneumatic device in any suitable manner. A plurality of air vents or holes 61 are provided in the cup-shaped shield 51 to permit air to escape therefrom to thereby avoid damping free movement of the weight 53.

An absorber of the type described in connection with Fig. 3 may be applied to a demolition implement as shown in Fig. 4. The demolition device includes a cylinder 81 forming a part of the body of the implement and in which a piston is arranged for reciprocation. Such a device includes handles 82 and 83 and air is supplied to the cylinder 81 under the control of the lever 84 which may be so disposed as to provide space for accommodating the absorber 85. The vibration control unit is similar to that shown and described in connection with Fig. 3 and includes a weight 86 and springs 87. The absorber 85 is so disposed that during reciprocating movements of the weight 86 the center of gravity moves along a linear path which is coincident with the axis 88 of the cylinder 81.

The larger pneumatic device which requires vibration absorbers of larger capacity and in connection with reciprocating devices on which it is not possible to mount a single absorber it is possible in carrying out the invention to arrange more than one vibration absorber on such equipment as shown in Figs. 5 and 6. Two absorbers 70 may be mounted at opposite sides of the air cylinder 71. The vibration of the body of the device is along the axis 78 of the cylinder 71. The arrangement is such that the center of gravity 72 of each absorber 70 moves parallel to the axis of vibration of the device. Additional absorbers 74 may be similarly mounted on the reciprocating device as shown in Fig. 5. Three absorbers 76 may be arranged in the manner as shown in Fig. 6. In this arrangement the vibrations of the air cylinder 77 are along the axis 78 and the center of gravity of each of the absorbers 76 is such that the weights move parallel to the axis 78.

While the invention has been described with reference to several types of devices having dynamic vibration absorbers applied thereto it will be appreciated that a vibration absorber may be employed in association with other types of reciprocating devices or machines which vibrate at a substantially constant frequency and in one degree of freedom. The invention is equally applicable to such equipment and changes in the details of the mounting and in the structure of the absorber parts may be made without departing from the spirit and scope of the invention as set forth in the appended claims.

What we claim and desire to secure by Letters Patent is:

1. A dynamic vibration absorber for a pneumatic device having a body including a handle and a cylinder extending forwardly therefrom with a piston within the cylinder actuated by compressed air to perform reciprocating movements comprising, a weight generally of cylindrical formation embracing said cylinder including an intermediate portion having opposite facing annular shoulders thereon and tubular portions extending axially beyond the respective shoulders, a ring member embracing the cylinder and maintained in fixed relationship adjacent the handle end of the cylinder, a helical spring embracing the cylinder and one tubular portion, said spring engaging one annular shoulder and engaging said ring member, a second ring member embracing and secured to the forward end of the cylinder, a second helical spring embracing said cylinder and the other tubular portion, said second spring engaging the other annular shoulder and engaging the second ring member, and a tubular shaped shield encasing said springs and weight and secured to said ring members.

2. A dynamic vibration absorber according to claim 1, wherein the second ring member is threaded on the cylinder.

3. A dynamic vibration absorber for a pneumatic device having a body including a cylinder with a piston therein actuated by compressed air to perform reciprocating movements with the cylinder comprising, a weight of substantially cylindrical formation embracing said cylinder having opposite facing annular shoulders thereon, a ring member embracing the cylinder and maintained in fixed relationship adjacent one end of the cylinder, a helical spring embracing the cylinder and engaging one annular shoulder and engaging said ring member, a second ring member embracing and secured to the other end of the cylinder, a second helical spring embracing said cylinder engaging the other annular shoulder and engaging the second ring member, and a tubular shaped shield encasing said springs and weight and having the ends secured to said ring members.

4. A dynamic vibration absorber for a pneumatic device having a body including a cylinder with a piston therein actuated by compressed air to perform reciprocating movements within the cylinder comprising, a weight of substantially cylindrical formation encircling said cylinder including an intermediate portion having opposite facing annular shoulders thereon and tubular portions extending axially beyond the respective shoulders, a ring member embracing the cylinder and maintained in fixed relationship adjacent one end of the cylinder, an annular spring seat on said ring member spaced outwardly of the periphery of said cylinder, a helical spring embracing the cylinder and one tubular portion, said spring engaging one annular shoulder and engaging said spring seat, a second ring member embracing and secured to the forward end of the cylinder, an annular spring seat on said second ring member spaced outwardly of the periphery of said cylinder, and a second helical spring embracing said cylinder engaging the other annular shoulder and engaging the spring seat on said second ring member.

5. A dynamic vibration absorber according to claim 3 wherein the tubular shaped shield is provided with spaced holes which extend through the wall thereof.

References Cited in the file of this patent

UNITED STATES PATENTS

| | | |
|---|---|---|
| 637,408 | Pindstofte | Nov. 21, 1899 |
| 1,679,291 | Byers | July 31, 1928 |
| 1,867,708 | Paton | July 19, 1932 |
| 2,051,954 | Leland | Aug. 25, 1936 |
| 2,277,124 | Maliphant et al. | Mar. 24, 1942 |
| 2,451,217 | Heinrich | Oct. 12, 1948 |
| 2,618,492 | Singer | Nov. 18, 1952 |
| 2,648,856 | Van Der Heem | Aug. 18, 1953 |
| 2,716,392 | Wieck | Aug. 30, 1955 |
| 2,736,393 | O'Connor | Feb. 28, 1956 |